Patented May 8, 1951

2,551,572

UNITED STATES PATENT OFFICE 2,551,572

PRODUCTION OF THIOPHENE CARBONITRILES

William I. Denton, Woodbury, and Richard B. Bishop, Haddonfield, N. J., assignors to Socony-Vacuum Oil Company, Incorporated, a corporation of New York No Drawing. Application April 6, 1948, Serial No. 19,433

11 Claims. (Cl. 260—329)

This invention relates to a process for producing thiophene carbonitriles and is more particularly concerned with a catalytic process for producing thiophene carbonitriles from alkyl thiophenes.

Thiophene carbonitriles are organic compounds comprised essentially of a thiophene nucleus with one or more nitrile groups attached to the carbon atoms therein. Their formula may be represented as follows:

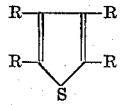

in which R in at least one instance represents the radical —C≡N and in which the remaining R's, if any, may represent hydrogen, or some other substituent in the thiophene nucleus. These compounds are especially useful as intermediates in organic syntheses and can be readily converted into many valuable products such as acids, amines, aldehydes, esters and the like.

As is well known to those familiar with the art, several processes have been proposed for the preparation of aromatic nitriles. In general, however, these processes have either been inapplicable to the preparation of thiophene carbonitriles, or have been disadvantageous, even for the preparation of aromatic nitriles from one or more standpoints, namely, the relatively high cost of the reactants employed, and/or the toxic nature of some of the reactants, and/or the number of and complexity of the operations involved. For example, aromatic nitriles have been synthesized by reacting alkali cyanides with aromatic sulfonates or with aromatic-substituted alkyl halides; by reacting more complex cyanides such as potassium cupracyanide, with diazonium halides; by reacting isothiocyanates with copper and with zinc dust; and by reacting arylaldoximes with acyl halides.

In United States patent application, Serial No. 649,118, filed by the same applicants, on February 20, 1946, now Patent No. 2,450,639, a simple, inexpensive process employing non-toxic reactants, was disclosed for the production of aromatic nitriles from alkyl aromatic hydrocarbons. Briefly, the process there disclosed comprises the reaction of alkyl aromatic hydrocarbons with ammonia, at elevated temperatures, in the presence of a catalytic material containing a vanadium oxide.

United States Patent application, Serial No. 641,640, filed January 16, 1946, now Patent 2,450,632, by H. P. Caldwell and H. D. Chapman, discloses that a similar reaction can be accomplished in the presence of a catalytic material containing a molybdenum oxide or tungsten oxide.

In accordance with the present invention, it has been discovered that carbonitrile of thiophene, of substituted thiophene and of homologues of these compounds, such as thionaphthene, substituted thionaphthene, thiophene, and substituted thiophene, can be produced by a similar kind of process.

This invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate and the like. The process of the present invention is also to be distinguished from the processes of the prior art for the production of amines wherein hydrocarbons are reacted with ammonia at high temperatures, or at lower temperatures in the presence of nickel.

Broadly stated, this invention provides an inexpensive and commercially feasible process for the production of thiophene carbonitriles which comprises reacting an alkyl thiophene type of compound with ammonia, in the gaseous state, at elevated temperatures, and in the presence of a catalytic material containing a substance selected from the group consisting of vanadium, molybdenum and tungsten oxides and mixtures thereof.

Generally speaking, any alkyl thiophene or homologue thereof is suitable as the thiophene-type reactant in the process of this invention. The alkyl-substituted thiophene-type compounds to be used in the process of this invention may be derived from any suitable source as is well known to those familiar with the art. Simple mono-, di-, and poly-methyl-substituted thiophene are preferred, although the principles of this invention are applicable to thiophenes substituted by longer chained alkyl groups, both saturated and unsaturated. Furthermore, the reaction of this invention may be performed upon any thiophene, or thiophene homologue, in which at least one hydrogen atom has been replaced by an alkyl radical, regardless of whether or not the other hydrogen atoms have been replaced by other, non-interfering substituents. Since most stable substituents are non-interfering for the purposes of this invention, an extremely wide choice of such substituents is possible. Preferred examples of satisfactory starting materials are mono-, di-, tri-, and tetra-methyl thiophene.

The proportions of reactants, i. e., alkyl thiophene and ammonia, to be used in this process may be varied over a wide range with little effect upon the conversion per pass and the ultimate yield. In general the charge of reactants may contain as little as two mol per cent or as much as ninety-eight mol per cent of the alkyl thiophene material. In practice, however, it is preferred to use charges containing between about twenty mol per cent and about ninety mol per cent of the alkyl thiophene type of material, and ordinarily it is preferred to use charges containing a molar excess of ammonia over that of the alkyl thiophene material.

It has been found that the catalyst to be used to produce the thiophene carbonitriles by reacting alkyl thiophenes with ammonia, are those containing a vanadium oxide, such as vanadium monoxide (VO), vanadium trioxide ($V_2O_3$), vanadium dioxide ($V_2O_2$) and vandium pentoxide ($V_2O_5$), molybdenum sesquioxide ($Mo_2O_3$), molybdenum dioxide ($MoO_2$), molybdenum trioxide ($MoO_3$), molybdenum pentoxide ($Mo_2O_5$), tungsten dioxide ($WO_2$) and tungsten trioxide ($WO_3$). In the interest of brevity, it should be understood that references hereinafter to vanadium oxide, molybdenum oxide and tungsten oxide, in this specification and in the claims, refer not to one but to all of the various oxides of the particular metals, as mentioned above. Of these various oxides, molybdenum trioxide and vanadium pentoxide are preferred.

While all of the various oxides mentioned are effective when used per se, they generally possess additional catalytic activity when used in conjunction with the well known catalyst supports such as alumina, silica gel, Carborundum, pumice, clays and the like. Activated alumina ($Al_2O_3$) has been found to be a particularly desirable catalyst support for the purpose of the present invention. Without any intent of limiting the scope of the present invention, it may be noted that the enhanced catalytic activity of the supported catalysts is apparently attributable primarily to their relatively large surface area.

The concentration of the various oxides in the supported catalyst influences the conversion per pass. In general, the conversion per pass increases with an increase in the concentration of the oxide. For example, it has been found that a catalyst comprising twenty parts by weight of an oxide on eighty parts by weight of activated alumina is more effective than one comprised of ten parts by weight of the oxide on ninety parts by weight of the activated alumina. It is to be understood, however, that supported catalysts containing larger or smaller amounts of oxides may be used in the process.

It has been found also that in order to obtain initial maximum catalytic efficiency, particularly when the catalytic material comprises the higher oxides, that the catalyst should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of the process when the catalyst comes into contact with the ammonia reactant.

In operation, the catalysts become fouled with carbonaceous material which ultimately affects their catalytic activity. Accordingly, when the efficiency of the catalyst declines to a point where further operation becomes uneconomical, or disadvantageous from a practical standpoint, the catalyst may be regenerated as is well known in the art by subjecting the same to a careful oxidation treatment, for example, by passing a stream of air or air diluted with flue gases over the catalyst under appropriate temperature conditions and for a suitable period of time, such as the same period of time as that of the catalytic operation. Preferably, the oxidation treatment is followed by a purging treatment, such as passing over the catalyst a stream of purge gas, for example, nitrogen, carbon dioxide, hydrocarbon gases or the like.

The reaction or contact time, that is, the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and 1 minute, particularly between 0.3 second and 30 seconds. It must be realized that these figures are at best estimates based on a number of assumptions. For all practical purposes, as in catalytic processes of the type of the present invention, the more reliable data on contact time is best expressed, as is well known in the art, in terms of liquid space velocities, in the present instance, the volume of liquid hydrocarbon reactant per volume of catalyst per hour. For example, at atmospheric pressure, it has been found that the space velocities may be varied considerably and that velocities varying between about one-fourth and about four are quite satisfactory for the purposes of the present invention.

In general, the temperatures to be used in this process vary between about 850° F. and the decomposition temperature of ammonia (about 1250–1300° F.), and preferably, temperatures varying between about 900° F. and about 1075° F. The preferred temperature to be used in any particular operation will depend upon the nature of alkyl thiophene-type reactant used and upon the type of catalyst employed. Generally speaking, the higher temperatures increase the conversion per pass but they also increase the decomposition of the reactance thereby decreasing the ultimate yields of thiophene carbonitriles. Accordingly, the criteria for determining the optimum temperature to be used in any particular operation will be based on the nature of the alkyl thiophene-type reactant, the type of catalyst, and a consideration of commercial feasibility from the standpoint of striking a practical balance between conversion per pass and losses as a result of decomposition.

The process of the present invention may be carried out at superatmospheric, atmospheric or subatmospheric pressures. Superatmospheric pressures are advantageous in that the unreacted charge materials condense more readily. Subatmospheric pressures appear to favor the reactions involved since the reaction products have a larger volume than the reactants and, hence, it is evident from the law of Le Chatelier-Braun that the equilibrium favors nitrile formation more at reduced pressures. However, such pressures reduce the through-put of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making thiophene carbonitriles is to introduce nitrogen directly into the alkyl radical of the alkyl thiophene-type reactant molecule, thereby avoiding intermediate steps with their accompanying increased cost. In the present process, it has been noted that considerable amounts of hydrogen are evolved; hence, it is postulated, without any intent of limiting the scope of the present invention, that the thiophene carbonitriles of this invention are formed in accordance with the following equations, using 2-methyl thiophene and 2,5-dimethyl thiophene as examples:

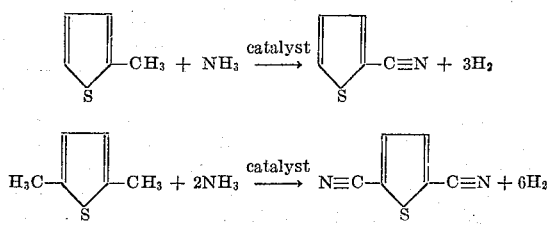

The present process may be carried out by making use of any of the well known techniques for operating catalytic reactions in the vapor phase effectively. By way of illustration, methyl thiophene and ammonia may be brought together in suitable proportions and the mixture vaporized in a preheating zone. The vaporized mixture may then be introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in the reaction chamber, the catalyst will be thereafter suitably separated from the reaction mixture by filtration or the like.

The reaction products will be predominantly thiophene carbonitrile, hydrogen, unchanged alkyl thiophene, and unchanged ammonia. The thiophene carbonitrile and the unchanged alkyl thiophene may be condensed by passing the products through a condensing zone and will be retained in the receiving chamber. The thiophene carbonitrile can be separated from the unchanged methyl thiophene by any of the numerous and well known separation procedures such as fractional distillation. Similarly, the uncondensed hydrogen and unchanged ammonia can easily be separated from each other. The unchanged alkyl thiophene and ammonia can be recycled with or without fresh alkyl thiophene and ammonia.

It will be apparent that the process may be operated as a batch or discontinuous process as by using the catalyst-bed-type reaction chamber in which the catalytic and regeneration operations alternate. With a series of such reaction chambers, it will be seen that as the catalytic operation is taking place in one or more of the reaction chambers, regeneration of the catalyst can be taking place in one or more of the other reaction chambers. Correspondingly, the process may be continuous when one or more catalyst chambers are used through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycled—will continuously flow through a reaction chamber.

The following detailed examples are for the purpose of illustrating modes of preparing thiophene carbonitriles in accordance with the process of this invention, it being clearly understood that the invention is not to be construed as limited to the specific alkyl thiophene reactants disclosed hereinafter or to the specific manipulations and conditions set forth in the examples. It will be apparent to those skilled in the art that a wide variety of other thiophene carbonitriles, and homologues thereof, may be prepared by a suitable choice of the alkyl thiophene-type reactant and suitable proportioning of reactants.

*Example I*

Mixed methyl thiophenes and ammonia were charged into a stainless steel reactor designed to hold catalyst, at a rate of 1.2 and 2.4 mols per hour, respectively. A space velocity of 0.25 (contact time about 6 seconds), a catalyst temperature of 890° F., and atmospheric pressure were used. The catalyst was ⅛ pellets of 20% molybdenum trioxide on activated alumina. 2½% of the methyl thiophenes charged was converted to thiophene carbonitrile per pass.

*Example II*

3-methyl thiophene and ammonia were reacted under the same conditions as in Example I, except that a catalyst temperature of 910° F. was maintained. 3½% of the 3-methyl thiophene charged was converted to thiophene carbonitrile per pass.

*Example III*

2-methyl thiophene and ammonia were reacted under the same conditions as in Example I except that a catalyst consisting of 10% $V_2O_5$ on alumina was used, a temperature of 1000° F. maintained, and the space velocity was 1.0. Two percent by weight of the 2-methyl thiophene was converted to 2 cyano thiophene per pass.

It will be apparent that the present invention provides an efficient, inexpensive and safe process for obtaining thiophene carbonitriles, substituted thiophene carbonitriles, and homologues thereof. The process is of considerable value in making available relatively inexpensive thiophene carbonitriles which are useful, for example, as intermediates in organic syntheses.

Although the present invention has been described in conjunction with certain examples, it is to be understood that modifications and variations in the processes of these examples may be made without departing from the spirit and scope of the invention, as those skilled in the art will

What is claimed is:

1. A process for manufacturing thiophene carbonitriles which comprises contacting a compound having a reactive alkyl thiophene nucleus with ammonia, in gaseous phase, at a temperature between about 850° F. and the temperature of decomposition of ammonia, in the presence of a catalyst comprising at least one oxide selected from the group consisting of the oxides of molybdenum and vanadium.

2. A process for manufacturing thiophene carbonitriles that comprises contacting alkyl-substituted thiophene with ammonia, in gaseous phase, at a temperature between about 850° F. and the temperature of decomposition of ammonia, in the presence of a catalyst comprising at least one oxide selected from the group consisting of the oxides of molybdenum and vanadium.

3. A process for manufacturing thiophene carbonitriles that comprises contacting alkyl-substituted thiophene with ammonia, in gaseous phase, at a temperature between about 900° F. to about 1075° F. in the presence of a catalyst comprising at least one oxide selected from the group consisting of the oxides of molybdenum and vanadium.

4. A process for manufacturing thiophene carbonitriles that comprises contacting a compound having a reactive alkyl thiophene nucleus with ammonia, in gaseous phase, at a temperature between about 850° F. and the temperature of decomposition of ammonia, in the presence of a catalyst comprising at least one oxide selected from the group consisting of the oxides of molybdenum and vanadium, said catalyst being supported upon a catalyst support.

5. A process for manufacturing thiophene carbontriles that comprises contacting a compound having a reactive alkyl thiophene nucleus with ammonia, in gaseous phase, at a temperature between about 850° F. and the temperature of decomposition of ammonia, in the presence of a catalyst comprising at least one oxide selected from the group consisting of the oxides of molybdenum and vanadium, said catalyst being supported upon alumina.

6. A process for manufacturing thiophene carbonitriles that comprises contacting a compound having a reactive methyl thiophene nucleus with ammonia, in gaseous phase, at a temperature between about 850° F. and the temperature of decomposition of ammonia, in the presence of a catalyst comprising at least one oxide selected from the group consisting of the oxides of molybdenum and vanadium.

7. A process for manufacturing thiophene carbonitriles that comprises contacting a compound having a reactive alkyl thiophene nucleus with ammonia, in gaseous phase, at a temperature between about 850° F. and the temperature of decomposition of ammonia in the presence of an oxide of molybdenum.

8. A process for manufacturing thiophene carbonitriles that comprises contacting a compound having a reactive alkyl thiophene nucleus with ammonia, in gaseous phase, at a temperature between about 850° F. and the temperature of decomposition of ammonia in the presence of an oxide of vanadium.

9. A process for manufacturing thiophene carbonitriles that comprises contacting a compound having a reactive alkyl thiophene nucleus with ammonia, in gaseous phase, at a temperature between about 850° F. and the temperature of decomposition of ammonia in the presence of an oxide of molybdenum supported on alumina.

10. A process for manufacturing thiophene carbonitriles that comprises contacting a compound having a reactive alkyl thiophene nucleus with ammonia, in gaseous phase, at a temperature between about 850° F. and the temperature of decomposition of ammonia in the presence of an oxide of vanadium supported on alumina.

11. A process of manufacturing thiophene carbonitriles that comprises contacting 3-methyl thiophene with ammonia in gaseous phase, at a temperature between about 850° F. and the temperature of decomposition of ammonia, in the presence of an oxide selected from the group consisting of the oxides of molybdenum and vanadium supported upon a catalyst support.

WILLIAM I. DENTON.
RICHARD B. BISHOP.

REFERENCES CITED

The following references are of record in the file of this patent:

UNITED STATES PATENTS

| Number | Name | Date |
| --- | --- | --- |
| 2,450,632 | Caldwell | Oct. 5, 1948 |
| 2,450,677 | Marisic | Oct. 5, 1948 |
| 2,496,661 | Denton | Feb. 7, 1950 |

OTHER REFERENCES

Bernthsen and Sudborough: "Organic Chemistry," page 549, Van Nostrand, N. Y., 1922.

Chemical Reviews, vol. 17, 1935, pp. 362 and 363.

Whitmore: "Organic Chemistry," page 893, Van Nostrand, N. Y., 1937.

Richter: "Organic Chemistry," pages 649–650, Wiley, N. Y., 1938.

Caesar and Sachanen: Ind. Eng. Chem. 40, 922 (1948).